April 29, 1924.
1,491,865
J. N. KELLY
MEANS FOR CONNECTING HUBS OR THE LIKE TO SHAFTS
Filed Oct. 6, 1921
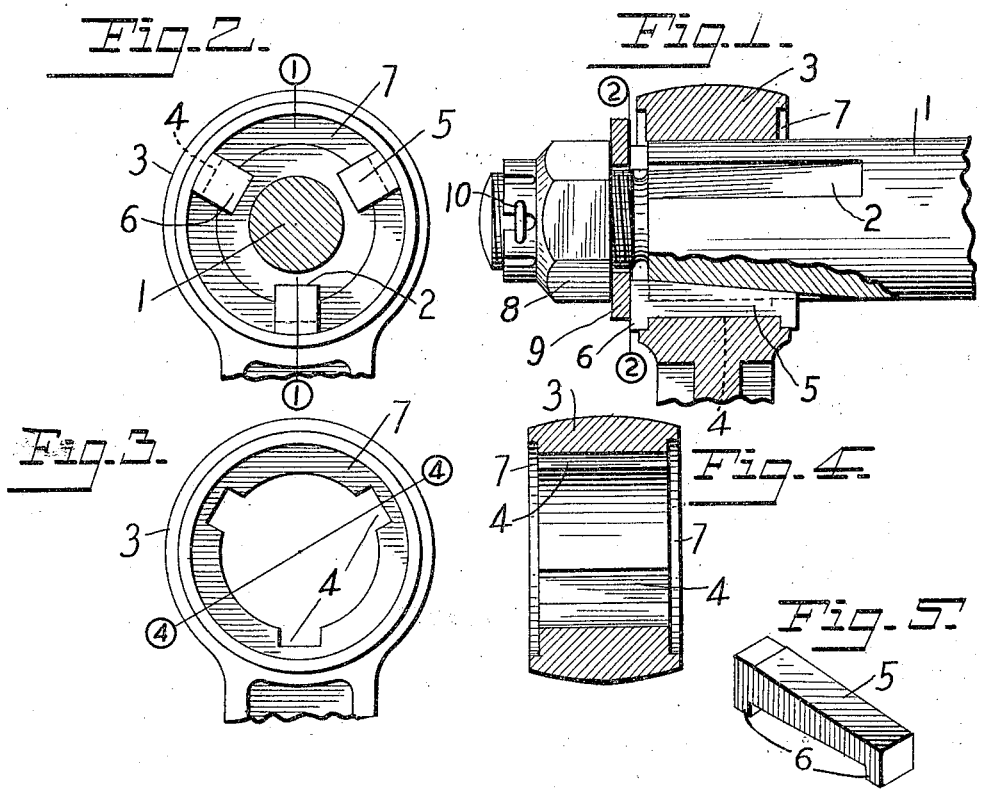
Inventor
JOSEPH N. KELLY.
By Edward T. Reed
Attorney Patented Apr. 29, 1924.

1,491,865

UNITED STATES PATENT OFFICE.

JOSEPH N. KELLY, OF DAYTON, OHIO.

MEANS FOR CONNECTING HUBS OR THE LIKE TO SHAFTS.

Application filed October 6, 1921. Serial No. 505,913.

*To all whom it may concern:*

Be it known that I, JOSEPH N. KELLY, a citizen of the United States, residing at Dayton, in the county of Montgomery and State of Ohio, have invented certain new and useful Improvements in Means for Connecting Hubs or the like to Shafts, of which the following is a specification, reference being had therein to the accompanying drawing.

This invention relates to means for connecting a hub or the like to a shaft.

One object of the invention is to provide a connection of this kind of a very strong, rigid character which will effectually prevent any displacement of the hub with relation to the shaft.

A further object of the invention is to provide a device of this kind which will be simple and inexpensive in its construction and with which a hub may be quickly and easily secured to the shaft.

A further object of the invention is to provide a device of this kind with which a hub may be secured either to the end of the shaft or to an intermediate portion thereof.

Other objects of the invention will appear as the device is described in detail.

In the accompanying drawings Fig. 1 is a view, partly in section and partly in elevation, showing the hub secured to the end of the shaft; Fig. 2 is a section taken on the line 2—2 of Fig. 1; Fig. 3 is an end view of the hub; Fig. 4 is a section taken on the line 4—4 of Fig. 3; Fig. 5 is a detail of the key shown in Fig. 1.

In these drawings I have illustrated two embodiments of my invention, one of which is designed for securing a hub, such as the hub of a propeller, or steering arm, to the end of a shaft, while the other embodiment of the invention is so designed that it may be used for securing a hub, such as the hub of a pulley, at any point throughout the length of the shaft. It will be understood that the two embodiments here shown have been chosen for the purpose of illustration only and that the connection may take various forms without departing from the spirit of the invention.

In that form of the device shown in Figs. 1 to 5, the shaft 1 is provided with a plurality of longitudinally extending grooves, or guideways, 2 which open through the end of the shaft and have their greatest depth at the end of the shaft. These keyways taper from the end of the shaft until they merge into the surface of the shaft. Any suitable number of keyways may be employed, but I prefer and have here shown three. The hub 3 fits snugly about the shaft and is provided with a plurality of keyways 4 corresponding in number with the keyways 2 and adapted to register with the keyways 2 when the hub is properly placed on the shaft. The keyways and the hub are, in the present instance, parallel with the axis of the shaft, that is, they are of uniform depth throughout their length. Loosely mounted in each keyway 4 of the hub is a key 5 which is tapered to correspond to the taper of the keyway 2 in the shaft. In the present construction, these keys are provided at their ends with outwardly extending lugs 6 which overlap the ends of the hub and hold the keys against longitudinal movement relatively thereto. Preferably the hub is provided with recesses 7 in which the lugs 6 lie, the recesses being in the present instance annular in form and so arranged as to provide flanges at the outer portions of the hub which overlie the lugs 6. The keys are placed in position in the respective keyways of the hub and the latter placed on the shaft with the keys extending into the keyways of the shaft. Suitable means are provided for forcing the keys firmly into the keyways in the shaft and thus providing a firm rigid connection between the hub and the shaft. As here shown, the end of the shaft is reduced and threaded to receive a nut 8 by means of which the keys are forced into the keyways in the shaft and held therein. A washer 9 is preferably interposed between the nut 8 and the ends of the keys. The nut may be held against displacement in any suitable manner, as by means of a cotter pin 10.

It will be apparent from the foregoing description that I have provided a very simple, inexpensive means for connecting a hub with a shaft, which is very strong and durable, and which will hold the hub rigidly in place on the shaft, preventing any relative movement or displacement of the parts. It will be further apparent that the connection may be utilized for connecting hubs of any character, or similar devices, to a shaft of any kind upon which the hub or other part is to be mounted.

While I have shown and described certain embodiments of my invention I wish it to be understood that I do not desire to be limited to the details thereof as various modifications may occur to a person skilled in the art.

Having now fully described my invention what I claim as new and desire to secure by Letters Patent is:

1. In a device of the character described, a shaft having a tapered keyway extending lengthwise thereof, a hub adapted to be mounted on said shaft and having a keyway extending lengthwise thereof, a tapered key to fit loosely into the keyway of said hub and having outwardly extending parts to overlap the ends of the hub to hold said key against displacement relatively thereto, and means for moving said hub and said key lengthwise of said shaft to seat the key firmly in said keyways.

2. In a device of the character described, a shaft having a plurality of keyways opening through one end thereof and inclined with relation to the axis of said shaft, a hub adapted to be mounted on said shaft and having a corresponding plurality of keyways parallel with the axis thereof, tapered keys loosely mounted in the respective keyways in said hub, and held against movement lengthwise thereof, and means acting on said keys and said hub to move the same lengthwise of said shaft.

3. In a device of the character described, a shaft having a plurality of keyways opening through one end thereof and inclined with relation to the axis of said shaft, a hub adapted to be mounted on said shaft and having a corresponding plurality of keyways parallel with the axis thereof, tapered keys loosely mounted in the respective keyways in said hub, said shaft having a reduced end portion, and a nut screw threaded onto said end portion of said shaft and acting on said keys to move them lengthwise of said shaft.

4. In a device of the character described, a shaft having a plurality of keyways opening through one end thereof and inclined with relation to the axis of said shaft, a hub adapted to be mounted on said shaft and having a corresponding plurality of keyways parallel with the axis thereof, tapered keys loosely mounted in the respective keyways in said hub and having lugs overlapping the ends of said hub to hold the keys against longitudinal movement relatively thereto, said hub having recesses in its ends to receive said lugs, and a nut mounted on said shaft to force said hub and said keys lengthwise thereof.

In testimony whereof, I affix my signature hereto.

JOSEPH N. KELLY.